(12) United States Patent
Numata

(10) Patent No.: US 11,882,353 B2
(45) Date of Patent: Jan. 23, 2024

(54) INFORMATION PROCESSING APPARATUS FOR CONTROLLING PARAMETER TO DETECT OBJECT, INFORMATION PROCESSING METHOD, AND STORAGE MEDIUM

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/834,692

(22) Filed: Jun. 7, 2022

(65) Prior Publication Data
US 2022/0400199 A1 Dec. 15, 2022

(30) Foreign Application Priority Data
Jun. 10, 2021 (JP) .................................. 2021-097300

(51) Int. Cl.
*H04N 23/61* (2023.01)
*H04N 23/56* (2023.01)
*H04N 23/71* (2023.01)

(52) U.S. Cl.
CPC ............. *H04N 23/61* (2023.01); *H04N 23/56* (2023.01); *H04N 23/71* (2023.01)

(58) Field of Classification Search
CPC ......... H04N 23/61; H04N 23/56; H04N 23/71
See application file for complete search history.

(56) References Cited

U.S. PATENT DOCUMENTS

2022/0400219 A1* 12/2022 Naito ..................... H04N 25/77

FOREIGN PATENT DOCUMENTS

JP 2019134271 A 8/2019

* cited by examiner

*Primary Examiner* — Twyler L Haskins
*Assistant Examiner* — Angel L Garces-Rivera
(74) *Attorney, Agent, or Firm* — CANON, U.S.A, Inc. IP Division

(57) ABSTRACT

An apparatus configured to obtain an event signal that indicates a position of a pixel and a time at which a luminance change has occurred includes a detection unit configured to detect an object based on the event signal, and a control unit configured to perform control to change at least one parameter in a case where a time period during which the detection unit does not detect the object is longer than a predetermined time period.

20 Claims, 5 Drawing Sheets

INFORMATION PROCESSING APPARATUS FOR CONTROLLING PARAMETER TO DETECT OBJECT, INFORMATION PROCESSING METHOD, AND STORAGE MEDIUM

BACKGROUND

Technical Field

The aspect of the embodiments relates to an object detection technique using an event-based sensor.

Description of the Related Art

There is known an event-based sensor that outputs a luminance change for each pixel as an address event signal on a real-time basis (Japanese Patent Application Laid-Open No. 2019-134271).

SUMMARY

According to an aspect of the embodiments, an apparatus configured to obtain an event signal that indicates a position of a pixel and a time at which a luminance change has occurred includes a detection unit configured to detect an object based on the event signal, and a control unit configured to perform control to change at least one parameter in a case where a time period during which the detection unit does not detect the object is longer than a predetermined time period.

Further features of the disclosure will become apparent from the following description of exemplary embodiments with reference to the attached drawings.

DESCRIPTION OF THE EMBODIMENTS

In a conventional event-based sensor, a detection sensitivity for an address event is controlled by controlling a time width of a dead band for a luminance change based on an address event detection frequency. However, the following issues occur in a case where the conventional event-based sensor is used for detecting a specific object at high speed. If a detection sensitivity for an address event is decreased (i.e., dead band is set narrower), a small luminance change is not detected, and thus a detection accuracy of an object deteriorates. On the other hand, in a case where a detection sensitivity for an address event is increased (i.e., dead band is set wider), a luminance change caused by a random noise such as a photon shot noise is detected in addition to a luminance change of an object, and the detection accuracy of the object also deteriorates.

Thus, in the following exemplary embodiments, a description will be given of a case where a detection accuracy of an object is improved by controlling at least one of imaging parameters related to an event-based sensor.

Hereinbelow, with reference to the attached drawings, a description will be given of an information processing apparatus (imaging apparatus) that performs an object detection based on an output of an event-based sensor according to the exemplary embodiments of the disclosure. In the exemplary embodiments, components and steps with the same functions are assigned the same numerals in all the drawings, and descriptions thereof are not repeated.

Figure 1:
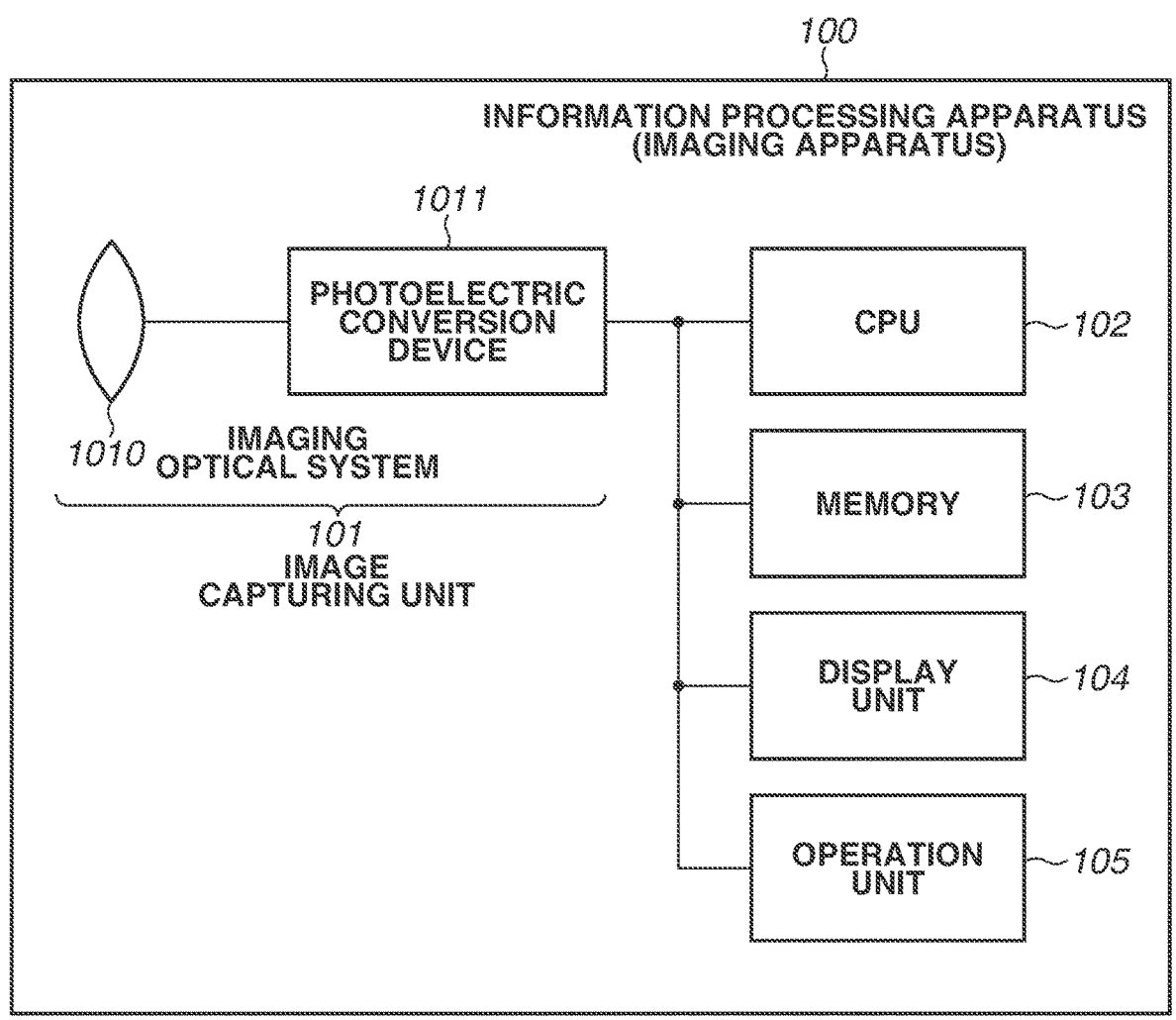
FIG. 1 is a block diagram illustrating a hardware configuration example of an information processing apparatus.

<Hardware Configuration of Information Processing Apparatus in FIG. 1>

FIG. 1 illustrates an information processing apparatus 100 (imaging apparatus) according to a first exemplary embodiment. In FIG. 1, the information processing apparatus 100 includes an image capturing unit 101 (event-based camera), a central processing unit (CPU) 102, a memory 103, a display unit 104, and an operation unit 105. Further, the image capturing unit 101 includes an imaging optical system 1010 and a photoelectric conversion device 1011 (event-based sensor). The image capturing unit 101 is a sensor that uses the photoelectric conversion device 1011 that outputs an address event signal based on received incident light. The image capturing unit 101 detects a luminance change for each pixel as an event. The address event signal indicates a position and a time of a pixel at which the luminance change has occurred. More specifically, the imaging optical system 1010 is a light receiving lens to receive incident light and form an image on the photoelectric conversion device 1011. The CPU 102 reads and executes an operating system and other programs stored in the memory 103 to control connected components to perform calculations and logical determinations for various kinds of processing. The processing performed by the CPU 102 includes information processing according to the present exemplary embodiment. Further, the CPU 102 controls focus driving and an aperture driving in the imaging optical system 1010, and driving of the photoelectric conversion device 1011. The memory 103 is, for example, a hard disk drive or an external storage device to store programs and various kinds of data related to the information processing according to the present exemplary embodiment. The display unit 104 outputs, based on an instruction by the CPU 102, a calculation result or the like of the information processing apparatus 100 to a display device. In addition, the display device may be of any type, and may be a liquid crystal display device, a projector, or a light-emitting diode (LED) indicator. The operation unit 105 is, for example, a touch panel, a keyboard, a mouse, or a robot controller, and is a user interface for receiving an instruction input by a user. Further, the information processing apparatus 100 may include components other than the hardware configuration described above.

Figure 2:
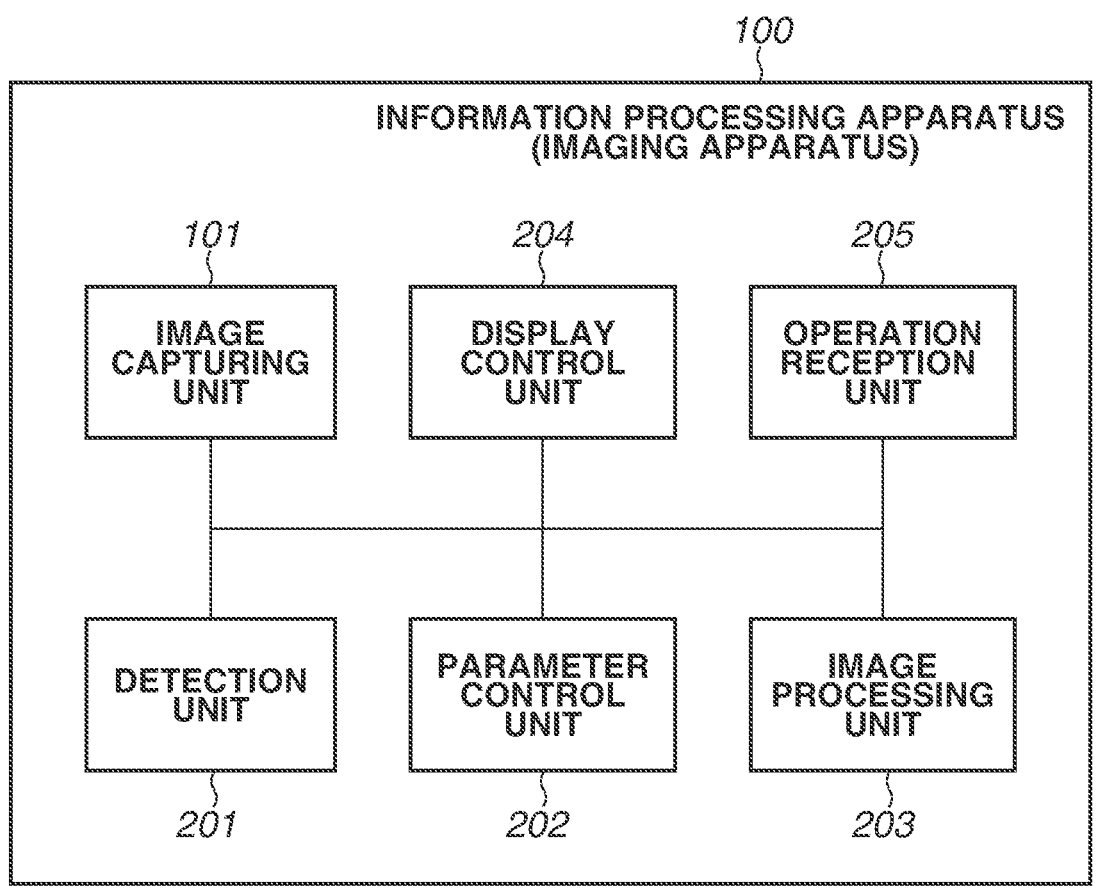
FIG. 2 is a block diagram illustrating a functional configuration example of the information processing apparatus.

<Functional Configuration of Information Processing Apparatus in FIG. 2>

Next, with reference to FIG. 2, a functional configuration example of the information processing apparatus 100 according to the present exemplary embodiment will be described. The information processing apparatus 100 includes the image capturing unit 101, a detection unit 201, a parameter control unit 202, an image processing unit 203, a display control unit 204, and an operation reception unit 205. The information processing apparatus 100 according to the present exemplary embodiment includes at least the detection unit 201 and the parameter control unit 202, but may include other functions. Here, an outline of each function will be described. The information processing apparatus 100 performs various kinds of information processing, based on an output of the image capturing unit 101 that outputs an address event signal based on the received incident light. The detection unit 201 detects an object in an imaging angle of view based on the address event signal. For example, assuming that the event-based sensor images an object in a fixed angle of view, a moving object in the imaging angle of view is detected as an object. On the other hand, in a case where the imaging parameter is fixed and a moving object is not present in the imaging angle of view, the detection unit 201 detects nothing because the address event signal is not generated so frequently. The detection unit 201 will be described below in detail. The parameter control unit 202 controls at least one parameter regarding the imaging of the event-based sensor (hereinbelow, referred to as an imaging parameter) to change. Details of the imaging parameter and control processing will be described below. The image processing unit 203 generates, based on the address event signal, an image in which a predetermined pixel value corresponding to a luminance change direction is given to a position of a pixel at which a luminance change has occurred. The display control unit 204 causes the display unit 104 to display the generated image on a display device. The operation reception unit 205 receives an operation from a user. For example, when the user designates a parameter to be targeted by the parameter control unit 202, the parameter control unit 202 determines a parameter to be changed based on the operation received by the operation reception unit 205.

Figure 3A:
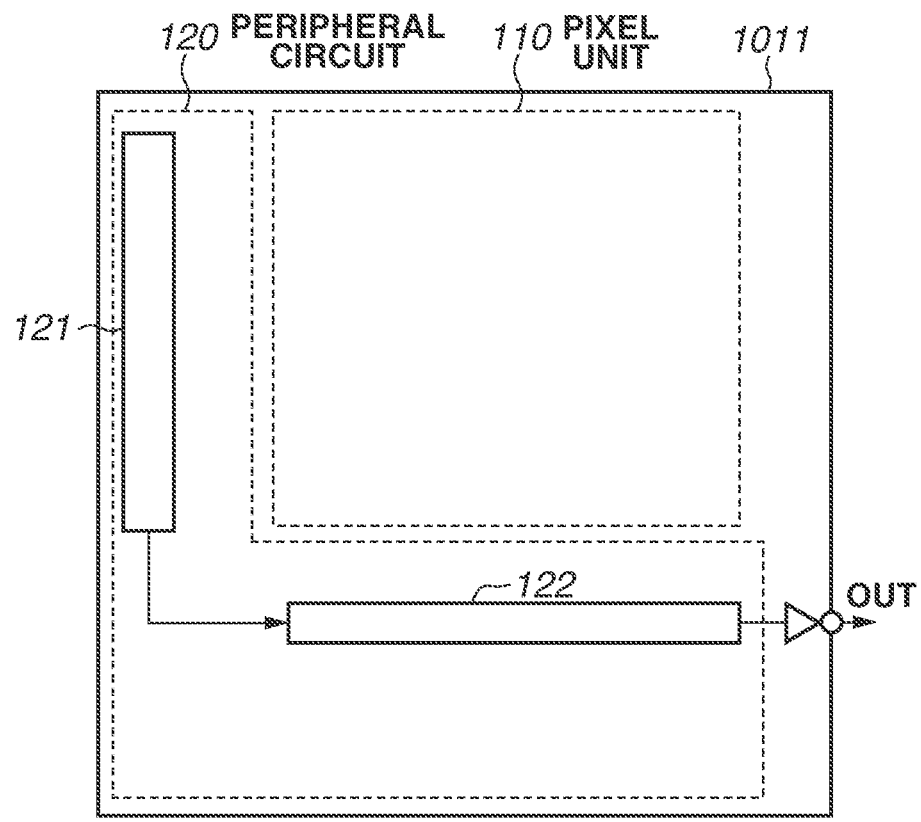
FIGS. 3A and 3B are block diagrams illustrating a configuration example of an event-based sensor (photoelectric conversion device).
Figure 3B:
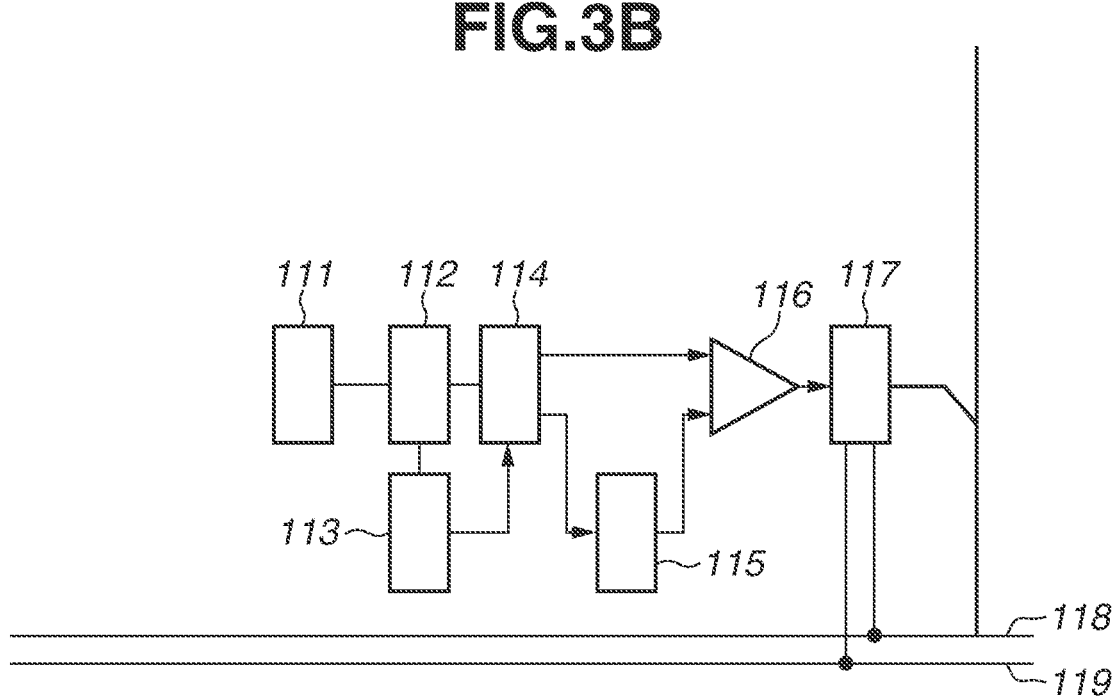

<Event Based-Sensor in FIGS. 3A and 3B>

An example of the event-based sensor according to the present exemplary embodiment will be described. The event-based sensor counts the number of incident photons, and determines a timing at which the number of counted photons exceeds a predetermined threshold value. Further, the event-based sensor measures a time period (number of clocks) required for the number of photons to reach or exceed a first threshold value. The event-based sensor detects a luminance change, by comparing the required time periods. More specifically, assuming that a required time period previously measured is T0 and a required time period currently measured is T, the event-based sensor detects a luminance change in the minus direction, in a case where the difference "T−T0" is larger than or equal to a second threshold value. In a case where the difference "T0−T" is larger than or equal to the second threshold value, the event-based sensor detects a luminance change in the plus direction. In a case where the difference between T and T0 is smaller than the second threshold value, the event-based sensor does not detect a luminance change. In addition, as the second threshold value, a value larger than or equal to zero and set in advance or set based on another parameter is used.

Hereinbelow, a detailed configuration will be described. FIG. 3A is a block diagram illustrating a configuration example of the photoelectric conversion device 1011. The photoelectric conversion device 1011 includes a pixel unit 110 and a peripheral circuit 120. The peripheral circuit 120 includes a vertical arbitration circuit 121 and a horizontal read-out circuit 122.

FIG. 3B is a block diagram illustrating a configuration example of each pixel unit included in the event-based sensor. The pixel unit 110 includes a photoelectric conversion unit 111, a pixel counter 112, a time counter 113, a first determination circuit 114, a memory 115, a comparison unit 116, a second determination circuit 117, a response circuit 118, and a selection circuit 119. The photoelectric conversion unit 111 includes an avalanche photodiode that operates in Geiger mode (Single Photon Avalanche Diode (SPAD)), and is configured to count the number of photons incident on the photoelectric conversion unit 111 using the pixel counter 112. The time counter 113 counts a time at which a photon is incident on the photoelectric conversion unit 111. By constituting the event-based sensor using the SPADs, a luminance change corresponding to one photon can be detected. By detecting a luminance change corresponding to one photon, an address event signal can be obtained even in a dark vision state such as a night.

When the number of photons counted by the pixel counter 112 reaches the first threshold value, the first determination circuit 114 stops the time counter 113 to count time. The memory 115 stores previous count values counted by the time counter 113, and a count value difference between the current counter value of the time counter 113, and the previous count value of the time counter 113 is obtained using the comparison unit 116.

The second determination circuit 117 transmits, in a case where the count value difference reaches or exceeds the second threshold value, a request signal to the vertical arbitration circuit 121 via the response circuit 118. The response circuit 118 receives from the vertical arbitration circuit 121 a response indicating whether address event data is permitted to be output. In a case where the count value difference is smaller than the second threshold value, the second determination circuit 117 does not transmit the request signal.

When the response circuit 118 receives a response indicating that the address event data is permitted to be output, the selection circuit 119 outputs the counted value by the time counter 113 to the horizontal read-out circuit 122. The horizontal read-out circuit 122 outputs, as an output signal, the received counted value from the photoelectric conversion device 1011 to the detection unit 201.

Since the count value difference calculated by the comparison unit 116 corresponds to an inverse number of an incident frequency of photons, the photoelectric conversion device 1011 according to the present exemplary embodiment has a function of measuring an "incident frequency change of photons", i.e., a luminance change. Further, an address event is output only in a case where a difference between time periods each at which the number of incident photons reaches the first threshold value is larger than or equal to the second threshold value (predetermined threshold value) using the second determination circuit 117. In other words, the photoelectric conversion device 1011 outputs the incident frequency in a case where the difference between the incident frequencies is larger than or equal to the second threshold value, and does not output the incident frequency in a case where the difference between the incident frequencies is smaller than the second threshold value. With this configuration, an asynchronous type photoelectric conversion device that detects a luminance change for each pixel address, as an address event, on a real-time basis can be implemented.

<Variation of Photoelectric Conversion Device>

In the above description, the description is given of the case where the photoelectric conversion device 1011 using the SPAD for the photoelectric conversion unit 111 is used to detect the incident frequency change of photons by measuring the time period during which the predetermined number of photons are incident. However, the configuration is not limited to that in FIG. 2, as long as an asynchronous type photoelectric conversion device that detects a luminance change as an address event on a real-time basis is used. For example, as discussed in Japanese Patent Application Laid-Open No. 2019-134271, a photoelectric conversion device that detects a luminance change as a voltage change may be used.

<Detection Unit 201>

The detection unit 201 detects an object based on an address event signal. More specifically, the detection unit 201 continuously detects a specific object such as a human eye set as a detection target in advance based on information of the luminance change output from the event-based sensor. One of specific processing procedures is performed as follows. First, the image processing unit 203 generates a frame image by integrating, for a given time period, address event signals output from the event-based sensor. The detection unit 201 detects a feature point from the generated frame image and detects a position of an object and an existence of the specific object, based on pattern matching between the detected feature point and a feature point detected from a template image of the specific object. The detection unit 201 can detect a position at which the similarity between the detected feature point and the feature point detected from the template image of the specific object is larger than or equal to a predetermined value, as the position of the specific object. However, a method other than the pattern matching may be used as the detection method. For example, an object may be detected by causing a convolution neural network (CNN) to learn a shape of an object in the generated frame image using machine-learning. Alternatively, the CNN may be caused to directly learn address event signals (luminance change information) output from the event-based sensor using machine-learning without generating a frame image. Further, the detection unit 201 may detect an object based on the number of responsive pixels and a range from address event signals, without generating a frame image.

In this case, as described above, the event-based sensor outputs the address event only in the case where the difference between the time periods each at which the number of incident photons reaches the first threshold value is larger than or equal to the second threshold value (predetermined threshold value). For example, in a case where the predetermined threshold value is considerably large, an address event signal may not be output if a movement amount of an object is small. In contrast, in a case where the predetermined threshold value is small, all the movements of an object and things included in a scene are output as address event signals. In this case, it is rather difficult to detect the object. On the other hand, the detection unit 201 cannot detect an object if no address event signal is output. For this reason, the threshold value is to be appropriately set depending on a situation, and a detection accuracy of the detection unit 201 may be improved by setting the predetermined threshold value appropriately.

In a case where the event-based sensor captures an image in a fixed and known angle of view, the information processing apparatus 100 outputs position information (e.g., coordinates) of the detected object to an external device via an output interface such as a network cable (not illustrated). In addition, an absolute position (i.e., position in the world coordinates) of the object can be obtained from the detected position of the object in the angle of view based on the position and the orientation of the event-based sensor. Further, the information processing apparatus 100 may include a display device and display the position of the object in a manner superimposing the luminance change output from the event-based sensor on the frame image obtained by integrating the luminance change for a predetermined time period. In a case where the event-based sensor can move, the position of the object is determined in consideration of the position of the event-based sensor.

<Parameter Control Unit 202>

The parameter control unit 202 performs control to change at least one parameter regarding the image capturing. In other words, the parameter control unit 202 controls an imaging condition (imaging parameter) of the imaging apparatus 100 including the event-based sensor. The imaging parameter includes at least one of a position of an object image on the image plane, a shape of the object image, and a luminance value of the object image. More specifically, the imaging parameter includes an imaging direction of the imaging apparatus 100, an imaging angle of view, a focus position, an amount of light incident on the pixels of the photoelectric conversion device 1011. By changing the imaging parameter, the luminance change intensity that the event-based sensor responds to may change, and the address event signal to be output may change in quality and amount. Accordingly, the number of address event signals exceeding the predetermined threshold value in the detection unit 201 may increase or decrease. Thus, it is easy to detect an object even though the object is motionless.

<Imaging Parameter Variation 1>

The imaging parameter may indicate the imaging direction (angle of view) of the image capturing unit 101 (event-based sensor) for obtaining the address event signal. For example, in a case where the imaging direction of the image capturing unit 101 is controlled, the information processing apparatus 100 may include an imaging direction drive mechanism including a motor and gears to be able to rotate the information processing apparatus 100 around a specific rotational shaft by controlling power for driving the motor. In this case, the information processing apparatus 100 may include a plurality of motors and a plurality of rotational shafts to rotate the information processing apparatus 100.

<Imaging Parameter Variation 2>

The imaging parameter may be a parameter to change the imaging angle of view of the image capturing unit 101.

For example, in a case where the imaging angle of view of the image capturing unit 101 is controlled, the information processing apparatus 100 may be configured to include a zoom magnification drive mechanism including a motor and gears, and may change the zoom magnification by moving a part of lenses in the imaging optical system 1010 in the optical axis direction. In addition, in the case where the zoom magnification is changed, since the shape (size) of the object previously detected changes, processing to input the association between the objects before and after zooming may be performed by a user.

<Imaging Parameter Variation 3>

The imaging parameter may be a parameter for changing a focus position of the image capturing unit 101. Similar to the case of changing the zoom magnification, in a case where the focus position of the information processing apparatus 100 is controlled, the information processing apparatus 100 may be configured to include a focus position drive mechanism including a motor and gears to move a part of lenses in the imaging optical system 1010 in the optical axis direction to change the focus position.

<Imaging Parameter Variation 4>

The imaging parameter may be a control value for adjusting an amount of light incident on the event-based sensor (photoelectric conversion device 1011) or a range of a wavelength of light incident on the event-based sensor. For example, to control the amount of light incident on the pixels of the photoelectric conversion device 1011, any one of an aperture of the imaging optical system 1010, a light absorption filter, and an illumination may be controlled. In the case of controlling the aperture of the imaging optical system 1010, the information processing apparatus 100 may include an aperture control mechanism to control the amount of light incident on the pixels of the photoelectric conversion device 1011 by opening or closing the aperture. In the case of controlling the light absorption filter, the information processing apparatus 100 may include an insertion/removal mechanism for inserting or removing the light absorption filter in the optical path of the imaging optical system 1010 to control the amount of light incident on the pixels of the photoelectric conversion device 1011 by inserting or removing the light absorption filter. Further, the light absorption filter may be a transmittance changeable filter configured of liquid crystal or the like to control the amount of light incident on the pixels of the photoelectric conversion device 1011 by controlling a voltage applied to the transmittance changeable filter. In the case of controlling the illumination, the information processing apparatus 100 may include an illumination unit for emitting light to which pixels of the photoelectric conversion device 1011 have a sensitivity, to control the amount of light incident on the pixels of the photoelectric conversion device 1011 by controlling the emitting intensity of the light emitted from the illumination unit.

Effect

In the information processing apparatus 100 according to the present exemplary embodiment, the parameter control unit 202 changes the object image on the image plane in a case where the period during which the detection unit 201 cannot detect the object is a predetermined continuous time period or more. With this configuration, it is possible to prevent the deterioration of the detection accuracy of the object. A detailed description will be given below.

Assume a use case where a specific object is continuously detected using an information processing apparatus 100 with an event-based sensor. The event-based sensor outputs a luminance change as an address event signal only in a case where a luminance change larger than or equal to a predetermined threshold value has occurred. Accordingly, in a case where only a luminance change smaller than the predetermined threshold value has occurred because the movement of the object is small, the address event signal is not output. In this case, the detection unit 201 cannot detect the object. Thus, in the information processing apparatus 100 according to the present exemplary embodiment, in a case where the detection unit 201 cannot detect the object, the parameter control unit 202 changes the object image on the image plane to generate a luminance change larger than or equal to the threshold value. If a luminance change larger than or equal to the threshold value occurs, the detection unit 201 can detect the object because the event-based sensor outputs an address event signal.

Further, in a case where the detection unit 201 cannot detect an object, as discussed in Japanese Patent Application Laid-Open No. 2019-134271, it may be possible to detect a small luminance change by increasing a detection sensitivity to an address event. However, in the case where a detection sensitivity for an address event is increased (i.e., the predetermined threshold value is decreased), the detection unit 201 may undesirably detect a luminance change caused by a random noise such as a photon shot noise. As a result, the luminance change caused by a small movement of the object may be buried in the luminance change caused by the random noise, and a detection accuracy of an object may deteriorate.

On the other hand, in the information processing apparatus 100 according to the present exemplary embodiment, the detection sensitivity to the address event is not increased, and the luminance change generated by changing the object image is output as an address event. Thus, the luminance change caused by the small movement of the object is not buried in the luminance change caused by the random noise, and it is possible to prevent the deterioration of the detection accuracy of the object.

As described above, the imaging parameter of the imaging apparatus 100 controlled by the parameter control unit 202 is to satisfy a condition that at least one of the object position image on the image plane, the shape, and the luminance value, changes. However, only the luminance value of the object image is changed rather than to change the luminance value of the entire image plane. More specifically, in one embodiment, at least one of the object position and the shape on the image plane is controlled by changing the imaging direction of the imaging apparatus 100, the zoom magnification, and focusing, rather than to control the amount of light incident on the pixels of the photoelectric conversion device 1011 by changing the aperture, the light adsorption filter, or the illumination. A detailed description will be given below.

In a case where the amount of light incident on the pixels of the photoelectric conversion device 1011 is controlled by the aperture, the light absorption filter, or the illumination, the luminance value of the entire image plane changes. In this case, in a case where physical properties (absorption and reflection characteristics) at positions on the object surface are the same, the luminance value at each pixel changes at a uniform rate, and thus, the detection unit 201 detects the same address event at each pixel. As a result, it is not possible to prevent the deterioration of the object detection accuracy because the luminance change caused by the change of the object image is buried in the luminance change of the background.

In other words, in the case where the amount of light incident on the pixels of the photoelectric conversion device 1011 is controlled, the detection unit 201 can detect, as an address event, only the luminance change caused by the difference of physical properties between the positions on the object surface. Accordingly, the effect of suppressing the object detection accuracy deterioration depends on the physical property difference between the object image and the background.

On the other hand, in the case where the imaging direction of the imaging apparatus 100 is changed, the object image position on the image plane can be changed, because the positional relationship between the object and the imaging apparatus 100 changes. Further, in the case where the zoom magnification of the imaging optical system 1010 is controlled, the object image size on the image plane changes, and in the case where the focus position is controlled, the blurring level of the object image on the image plane changes. Thus, in all the cases, the shape of the object image can be changed. In other words, by controlling the imaging direction, the zoom magnification, or the focusing of the imaging apparatus 100, it is possible to detect, as an address event, the luminance change caused by the texture or the contour part of the object image. As a result, the luminance change caused by the change of object image is not buried in the luminance change of the background, and thus the deterioration of the object image detection accuracy can be further suppressed.

Modification Example 1

In addition, in the case where the light absorption filter or the illumination is used, it is possible to effectively detect the physical property difference between the object image and the background by controlling spectral characteristics of the light absorption filter or the illumination. More specifically, a filter or an illumination that emphasizes a response with respect to light different in the physical property of the object image and the background, may be used.

For example, assume a case where the object is red, i.e., the object selectively reflects light having a wavelength of about 650 nm, and the background is white, i.e., the background reflects all the visible light. If a band stop filter that absorbs only red light (light with a wavelength of about 650 nm) is used as the light absorption filter, since the luminance value of only the object portion changes by the insertion and removal of the light absorption filter, the luminance change of only the object image can be detected as an address event. The band stop filter is implemented by, for example, a multi-layer film interference filter.

Further, if an illumination unit for emitting only red light (light with a wavelength of about 650 nm) is prepared as the illumination, since the luminance value of only the object image changes by the change of illumination intensity, it is possible to detect, as an address event, the luminance change of only the object image. The illumination unit emitting only the red light can be implemented by, for example, a light emitting diodes (LEDs) made of indium gallium arsenide (InGaAs). As described above, it is possible to effectively detect the difference of physical properties between the object image and the background, by using at least one of the light absorption filter that selectively absorbs light with the specific wavelength and the illumination unit that emits light with the specific wavelength.

Modification Example 2

In a case where the detection unit 201 cannot detect the object even though the parameter control unit 202 changes the imaging parameter, it is to change at least one of the change amount and the type of the imaging parameter controlled by the parameter control unit 202.

First, the case where the change amount of the imaging parameter is controlled will be described. In the modification example 2, an example of controlling the imaging direction is described. In a case where the detection unit 201 cannot detect an object even though the imaging direction is changed, there is a possibility that the luminance change larger than or equal to the threshold value does not occur, because, for example, the object is located at a large distance and the movement amount of the object on the image plane is smaller than the movement amount corresponding to one pixel. Thus, in the case where the detection unit 201 cannot detect the object, it is to cause the luminance change larger than or equal to the threshold value by largely changing the imaging direction to make the moving amount of the object on the image plane larger than that corresponding to one pixel. More specifically, in a case where the change amount of the parameter controlled by the parameter control unit 202 is changeable, it is to change the change amount of the imaging parameter controlled by the parameter control unit 202, in a case where the detection unit 201 cannot detect the object even though the parameter control unit 202 has controlled the imaging parameter. In this way, it is possible to generate the luminance change larger than or equal to the threshold value, and to detect the object.

Next, the case where the type of the imaging parameter is changed will be described. In the case where the detection unit 201 cannot detect the object even though the imaging direction is changed, there is a possibility that the luminance change caused by the changed parameter is difficult to be detected by the detection unit 201. As described above, in the case where the detection unit 201 cannot detect the object even though the imaging direction is changed, there is a possibility that the luminance change larger than or equal to the threshold value does not occur, because, for example, the object is located at a large distance and the movement amount of the object on the image plane is smaller than the movement amount corresponding to one pixel.

In this case, it is to generate the luminance change larger than or equal to the threshold value by moving the zoom magnification of the imaging optical system 1010 to the telephoto side to increase the movement amount of the object on the image plane. This is an example of controlling the imaging direction first and controlling the zoom magnification next.

In addition, there is an example of controlling the amount of light first, and controlling any one of the imaging direction, the zoom magnification, and the focus position next. As described above, in the case where the amount of light is controlled by using the aperture, the light absorption filter, or the illumination, if the difference of physical properties between the object image and the background is small, the luminance change caused by the change of the object image may sometimes be buried in the luminance change of the background. In this case, the luminance change caused by the texture or the contour portion of the object image is caused to be detectable as an address event by changing the imaging direction of the imaging apparatus 100 or controlling the zooming position or the focus position.

Further, there is a possibility that the object has moved with a luminance change smaller than the threshold value and is out of the angle of view of the imaging apparatus 100, during a period in which the detection unit 201 cannot detect the object and which continues. In this case, in the case where the detection unit 201 cannot detect the object, it is to generate a luminance change larger than or equal to the threshold value while keeping the object within the angle of view of the imaging apparatus 100 by changing the imaging direction, or increasing the imaging angle of view.

More specifically, in a case where the type of the imaging parameter controlled by the parameter control unit 202 is changeable, and if the detection unit 201 cannot detect the object even though the parameter control unit 202 controls the imaging parameter, it is to change the type of the imaging parameter controlled by the parameter control unit 202. In this way, it is possible to generate the luminance change larger than or equal to the threshold value, and to detect the object.

Modification Example 3

The detection unit 201 performs tracking processing by storing a detected position of an object in the memory 103. In this case, the frequency of controlling the imaging parameter is reduced by the parameter control unit 202 in a case where the object has not moved from its previous position as a result of detecting the object by the parameter control unit 202 controlling the imaging parameter. More specifically, the parameter control unit 202 further increases the predetermined threshold value in a case where the detection unit 201 detects the object at a position that is the same as the stored position of the object after changing the imaging parameter. More specifically, in a configuration in which the parameter control unit 202 controls the imaging parameter in a case where a period during which the detection unit 201 cannot detects the object continues more than or equal to a predetermined time period, the predetermined threshold value is increased if the object has not moved from its previous position. Consumed power for controlling the drive mechanism of the parameter and for controlling the illumination reduces, because the frequency of controlling the imaging parameter by the parameter control unit 202 decreases by increasing the predetermined threshold value.

On the other hand, the parameter control unit 202 decreases the predetermined threshold value in a case where the detection unit 201 detects the object at a position different from the stored position after the parameter control unit 202 has changed the parameter. In this case, it is understood that the object has moved with a luminance change smaller than the threshold value in a case where the object has moved from the previous position. In such a case, the parameter control unit 202 controls the imaging parameter more frequently. More specifically, the predetermined threshold value is decreased in a case where the object has not moved from the previous position, in the configuration that the parameter control unit 202 controls the imaging parameter if the period during which the detection unit 201 cannot detect the object has continued. Since the parameter control unit 202 controls the imaging parameter more frequently by decreasing the predetermined threshold value, the possibility of failing to catch the movement of the object with a luminance change smaller than the threshold value decreases. Whether the object has moved may be determined, for example, based on whether the center-of-gravity position of the object has moved more than a distance corresponding to a predetermined number of pixels. In one embodiment, the predetermined number of pixels is more than or equal to one and less than or equal to the number of pixels corresponding to one tenth of the angle of view.

Further, in a case where the imaging range has become wider by changing the parameter, the parameter control unit 202 may decrease the predetermined threshold value if the detection unit 201 detects the object. It is understood that the object has moved in a larger distance with a luminance change smaller than the threshold value in a case where the position of the object has moved out of the angle of view as a result of having detected the object by changing the imaging direction or increasing the imaging angle of view. In such a case, in one embodiment, the parameter control unit 202 changes the predetermined threshold value to be smaller than that when the object has moved within the angle of view. Since the parameter control unit 202 controls the imaging parameter more frequently by decreasing the predetermined threshold value, the possibility of failing to catch the movement of the object with a luminance change smaller than the threshold value further decreases.

Modification Example 4

The display control unit 204 causes the display unit 104 to output the detection result of the address event signal or the object. The display control unit 204 may display a frame image having subjected to image processing based on the address event signal on a display device. Further, the display control unit 204 may control the display unit 104 to notify the user of an error in a case where the detection unit 201 has not detected the object.

Further, the display control unit 204 may output a display with which it is understandable that the parameter control unit 202 is controlling the imaging condition (imaging parameter) when the parameter control unit 202 is controlling the imaging condition (imaging parameter). For example, in a case where the information processing apparatus 100 includes a display device and the parameter control unit 202 is controlling the imaging parameter, the display control unit 204 may display using character information, on the display device, that the parameter control unit 202 is controlling the imaging parameter. With this configuration, it is possible to distinguish whether the object image is changing by controlling the imaging parameter or by the movement of the object or the change of the environmental light.

Further, in a case where the information processing apparatus 100 includes a processing unit for processing the output of the photoelectric conversion device 1011 to generate and display a frame image on a display device, the control information of the imaging parameter is displayed in a superimposed manner on the frame image. A specific example will be described below.

When the parameter control unit 202 is controlling the imaging direction, the position of the object on the frame image changes by controlling the imaging direction even though the object has not moved. Thus, the position of the object on the frame image (so-called electronic image stabilization) is shifted in accordance with the control of the imaging direction. In this way, it is possible to display the position change of the object caused by controlling the imaging direction, and the position change of the object caused by the movement of the object itself in a distinguished manner.

Figure 4A:
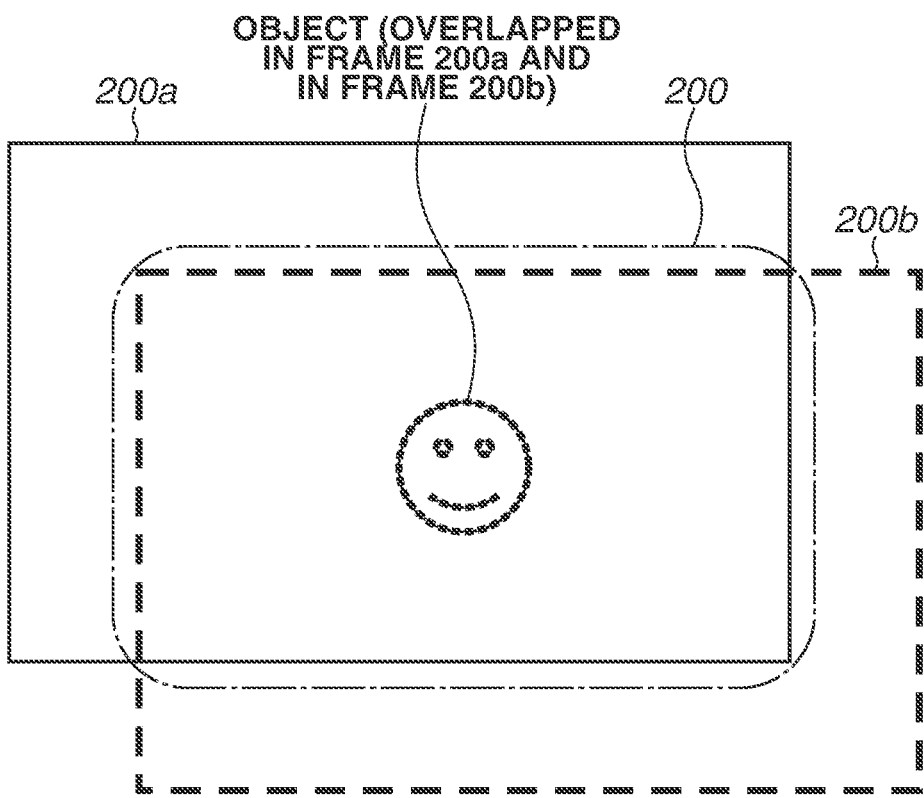
FIGS. 4A and 4B are diagrams each illustrating an example of an image generated by the event-based sensor.
Figure 4B:
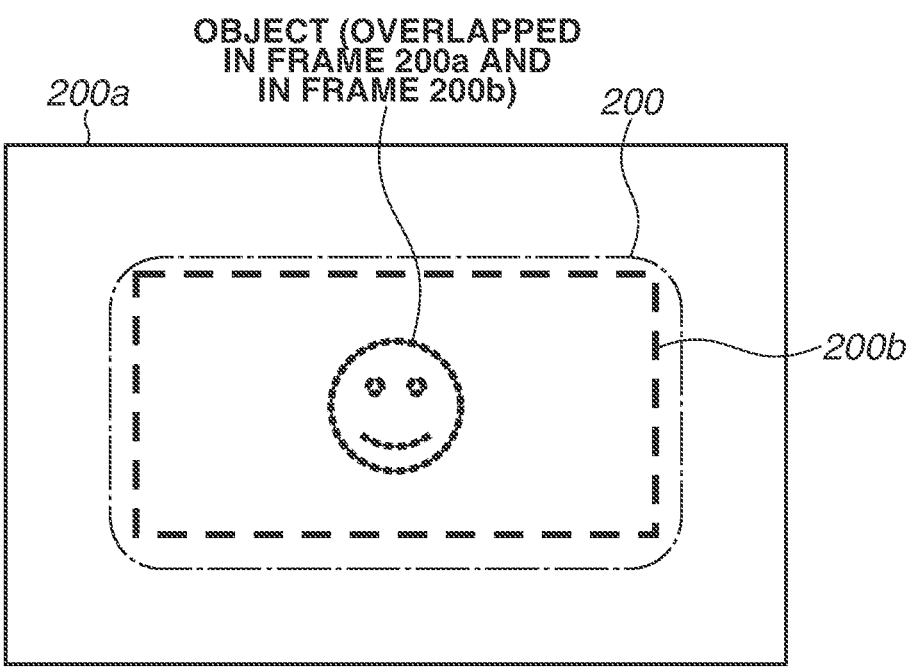

Similarly, the position of the object on the frame image changes, in a case where the parameter control unit 202 is moving the imaging angle of view to the wide-angle side. For this reason, a so-called electronic zooming that cuts out a part of the frame image in accordance with the control of the imaging angle of view is used. In this way, it is possible to display the position change of the object caused by controlling the imaging angle of view, and the position change caused by the movement of the object itself in a distinguished manner. In both cases of using the electronic image stabilization and the electronic zooming, a part of the frame image is displayed, and the whole frame image may be displayed in a superimposed manner. In this case, a part of a frame image 200 in an enclosed manner with a frame is displayed so that the part of the frame image 200 can be distinguished from the whole frame images 200a and 200b as illustrated in FIGS. 4A and 4B.

<Flowchart of Entire Operation>

Figure 5:
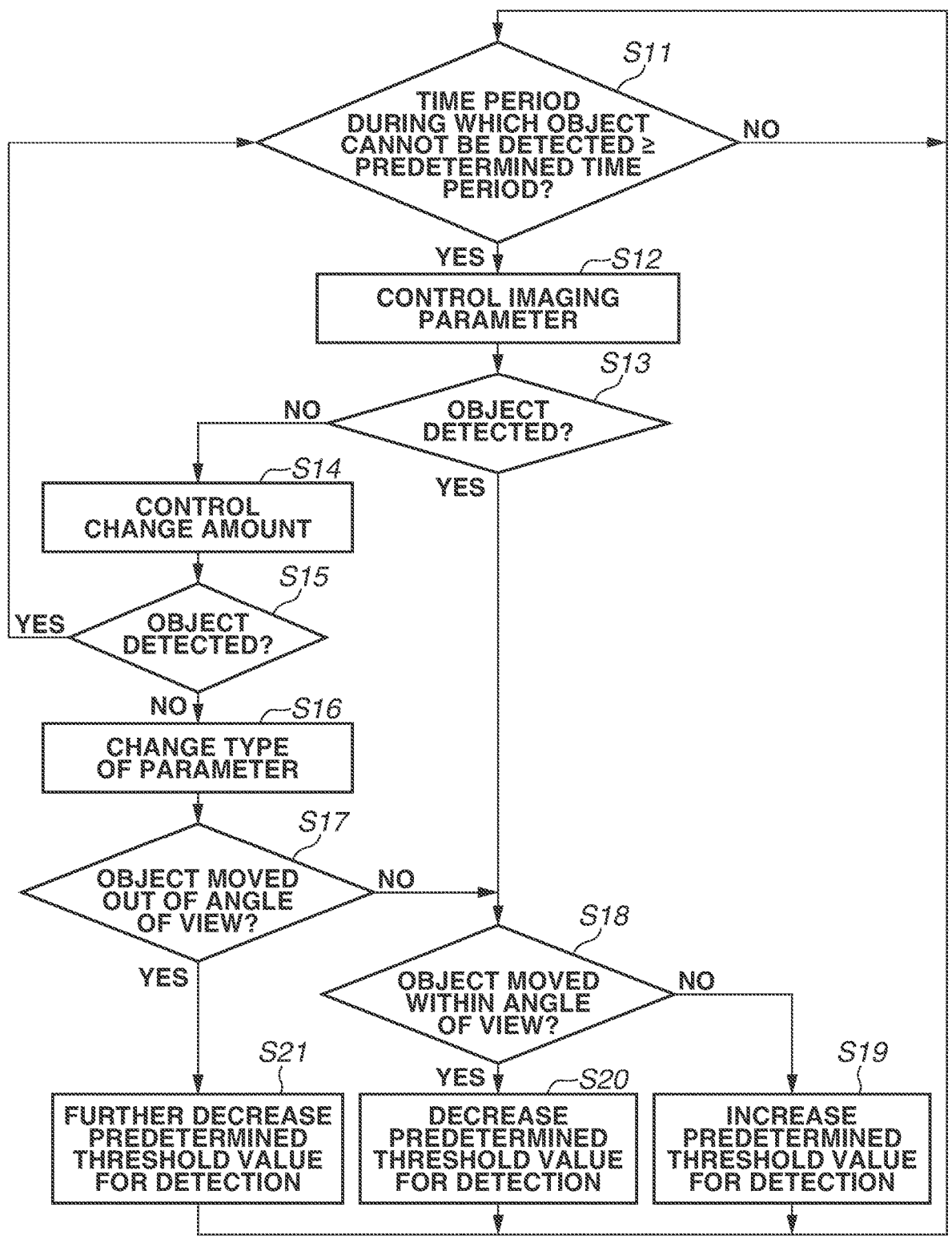
FIG. 5 is a flowchart illustrating processing performed by the information processing apparatus.

FIG. 5 is a flowchart illustrating an operation of the information processing apparatus 100 according to the present exemplary embodiment. The processing illustrated in the flowchart of FIG. 5 is implemented by the CPU 102 (computer) in FIG. 1 reading and executing a computer program stored in the memory 103. In step S11, the detection unit 201 determines whether a time period during which the detection unit 201 cannot detect an object is longer than or equal to the predetermined time period as a trigger of the parameter control processing. As a result of the determination, if the detection unit 201 determines that it is longer than or equal to the predetermined time period (YES in step S11), the processing proceeds to step S12. In step S12, the parameter control unit 202 controls the imaging parameter. If the detection unit 201 determines that it is shorter than the predetermined time period (NO in step S11), the detection unit 201 continues to detect the object in step S11, without changing the imaging parameter.

In step S13, the detection unit 201 determines whether the object is detected after the parameter control unit 202 controls the imaging parameter. In a case where the detection unit 201 detects the object (YES in step S13), the processing proceeds to step S18. In step S18, the detection unit 201 further determines whether the position of the object has moved. On the other hand, in a case where the detection unit 201 does not detect the object (NO in step S13), the processing proceeds to step S14. In step S14, the parameter control unit 202 changes the change amount of the imaging parameter to be given to the object.

In step S15, the detection unit 201 determines whether the object is detected as a result of changing the change amount of the imaging parameter in step S14. In a case where the detection unit 201 determines that the object is detected (YES in step S15), the processing returns to step S11 to return the imaging parameter to the previous state. Then, the detection unit 201 continues to detect the object. In addition, the imaging parameter is not necessarily returned to the previous state. On the other hand, in a case where the detection unit 201 determines that the object is not detected (NO in step S15), the processing proceeds to step S16. In step S16, the parameter control unit 202 changes the type of the imaging parameter to be controlled.

In step S17, the detection unit 201 determines whether the position of the object has moved out of the angle of view. If the detection unit 201 determines that the position of the object has not moved out of the angle of view (NO in step S17), the processing proceeds to step S18. In step S18, the detection unit 201 further determines whether the position of the object has moved within the angle of view.

In step S18, in a case where the detection unit 201 determines that the position of the object has not moved within the angle of view (NO in step S18), the processing proceeds to step S19. In step S19, the detection unit 201 increases the predetermined threshold value. On the other hand, in a case where the detection unit 201 determines that the position of the object has moved within the angle of view (YES in step S18), the processing proceeds to step S20. In step S20, the detection unit 201 decreases the predetermined threshold value. Further, in step S17, the position of the object has moved out of the angle of view (YES in step S17), the processing proceeds to step S21. In step S21, the detection unit 201 decreases the predetermined threshold value more than that in step S20.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-097300, filed Jun. 10, 2021, which is hereby incorporated by reference herein in its entirety.

What is claimed is:

1. An apparatus comprising:
a photoelectric conversion device that outputs an event signal indicating both a position of a pixel and a time at which a luminance change has occurred;
at least one processor; and
a memory coupled to the at least one processor, the memory storing instructions that, when executed by the at least one processor, cause the at least one processor to:
detect an object based on the event signal output by the photoelectric conversion device; and
change at least one parameter in a case where a time period during which the object is not detected, is longer than a predetermined time period.

2. The apparatus according to claim 1, wherein the parameter includes a parameter to change at least one of a position, a shape, or a luminance value of an image of the object on a plane.

3. The apparatus according to claim 2, wherein the parameter includes a direction of a capturing device that obtains the event signal.

4. The apparatus according to claim 3, wherein the parameter is a parameter for changing an angle of view of the capturing device.

5. The apparatus according to claim 3, wherein the parameter is a parameter for changing a focus position of the capturing device.

6. The apparatus according to claim 1,
wherein the apparatus is an imaging apparatus including at least one of an aperture, a light absorption filter, or an illumination unit, and
wherein the parameter is a control value for adjusting an amount of light incident on a conversion device configured to obtain the event signal.

7. The apparatus according to claim 6, further comprising at least one of a light absorption filter that selectively absorbs light with a specific wavelength, or an illumination device that emits light with a specific wavelength,
wherein the parameter is a control value for adjusting a range of a wavelength of light received by the conversion device.

8. The apparatus according to claim 1, wherein, in a case where the object is not detected even though the parameter has been changed, an amount of change with respect to the changed parameter, or a parameter of a different type from the changed parameter among the parameters is changed.

9. The apparatus according to claim 1, further comprising a storage unit configured to store a position of the detected object,
wherein the event signal is output related to a pixel with a luminance change exceeding a predetermined threshold value, and
wherein the predetermined threshold value is increased in a case where the object is detected after changing the parameter at a position that is a same as the stored position of the object.

10. The apparatus according to claim 9, wherein the predetermined threshold value is decreased in a case where the object is detected after changing the parameter at a position different from the stored position of the object.

11. The apparatus according to claim 9, wherein, in a case where a range has become wider by changing the parameter, the predetermined threshold value is decreased in a case where the object is detected.

12. The apparatus according to claim 1, further comprising an output unit configured to output the event signal or a detection result of the object,
wherein the output unit outputs a notification in a case where the parameter is changed.

13. The apparatus according to claim 12, wherein the output unit outputs a notification to a user in a case where the object is not detected even though the parameter has been changed.

14. The apparatus according to claim 12, further comprising a generation unit configured to generate a frame image based on the event signal,
wherein the output unit outputs, in a case where a direction as the parameter is controlled, the generated frame image on which a position of the object is changed based on the direction, and
wherein the output unit outputs, in a case where an angle of view as the parameter is controlled, a part of the generated frame image.

15. The apparatus according to claim 1, wherein a predetermined object is detected based on a position of a pixel having a predetermined signal included in the event signal.

16. The apparatus according to claim 1, wherein the event signal is output by a conversion device including a pixel that outputs a signal in response to an input of a photon.

17. A non-transitory storage medium storing a program for causing a computer to execute a method, the method comprising:
obtaining an event signal indicating both a position of a pixel and a time at which a luminance change has occurred;
detecting an object based on the event signal; and
changing at least one parameter, in a case where a time period during which the object is not detected is longer than a predetermined time period.

18. The non-transitory storage medium according to claim 17, wherein the parameter includes at least one of a position, a shape, or a luminance value of an image of the object on a plane.

19. A method comprising:
obtaining an event signal indicating both a position of a pixel and a time at which a luminance change has occurred;
detecting an object based on the event signal; and
changing at least one parameter, in a case where a time period during which the object is not detected is longer than a predetermined time period.

20. The method according to claim 19, wherein the parameter includes a parameter to change at least one of a position, a shape, or a luminance value of an image of the object on a plane.

* * * * *